(12) United States Patent
Lin

(10) Patent No.: US 8,794,479 B2
(45) Date of Patent: Aug. 5, 2014

(54) DRINKING CONTAINER WITH COOLING RESERVOIR

(76) Inventor: Jer Hong Lin, Kaohsiung (TW)

( * ) Notice: Subject to any disclaimer, the term of this patent is extended or adjusted under 35 U.S.C. 154(b) by 129 days.

(21) Appl. No.: 13/242,314

(22) Filed: Sep. 23, 2011

(65) Prior Publication Data

US 2012/0080441 A1 Apr. 5, 2012

(30) Foreign Application Priority Data

Sep. 30, 2010 (TW) .............................. 99133341 A

(51) Int. Cl.
| | | |
|---|---|---|
| *A47G 19/22* | (2006.01) | |
| *B65D 83/00* | (2006.01) | |
| *B65D 47/06* | (2006.01) | |
| *G01F 11/26* | (2006.01) | |

(52) U.S. Cl.
CPC .............. *B65D 47/06* (2013.01); *G01F 11/262* (2013.01)
USPC ........... 220/718; 220/719; 220/711; 215/387; 62/457.3

(58) Field of Classification Search
USPC ............ 220/623, 711–719, 592.17, 521, 738, 220/737, 202, 203, 203.01, 721, 745, 749, 220/730, 501, 254.3; 215/307–309, 387; 62/457.3

See application file for complete search history.

(56) References Cited

U.S. PATENT DOCUMENTS

| | | | |
|---|---|---|---|
| 3,301,459 A * | 1/1967 | Gardner ........................ 220/266 |
| 3,722,783 A | 3/1973 | Rous | |
| 3,806,023 A * | 4/1974 | Barnett ......................... 229/404 |
| 3,860,162 A * | 1/1975 | Schutz ........................... 220/711 |
| 3,938,695 A * | 2/1976 | Ruff .............................. 220/713 |
| 4,113,135 A | 9/1978 | Yamazaki | |
| 4,285,442 A | 8/1981 | Wedzik | |
| 4,394,928 A | 7/1983 | Philip | |
| 4,412,629 A | 11/1983 | Dart et al. | |
| 4,582,214 A | 4/1986 | Dart et al. | |
| 4,615,459 A | 10/1986 | Clements | |
| 5,090,584 A | 2/1992 | Roberts et al. | |
| 5,183,172 A | 2/1993 | Boller | |
| 5,253,781 A | 10/1993 | Van Melle et al. | |
| 5,490,609 A * | 2/1996 | Lane et al. ..................... 220/712 |
| 5,607,076 A * | 3/1997 | Anthony ........................ 220/501 |
| 5,894,952 A | 4/1999 | Mendenhall et al. | |
| 6,176,390 B1 * | 1/2001 | Kemp ............................ 220/712 |
| 6,196,404 B1 | 3/2001 | Chen | |
| 6,305,571 B1 * | 10/2001 | Chu ............................... 220/719 |
| 6,318,584 B1 * | 11/2001 | Milan ............................ 220/713 |
| 6,375,033 B1 * | 4/2002 | Fleming ........................ 220/713 |
| 6,488,173 B2 * | 12/2002 | Milan ............................ 220/713 |
| 6,571,973 B1 * | 6/2003 | Tripsianes .................... 222/256 |
| 6,578,726 B1 * | 6/2003 | Schaefer ....................... 220/253 |
| 6,612,456 B1 * | 9/2003 | Hundley et al. ............. 220/254.3 |

(Continued)

*Primary Examiner* — Bryon Gehman
*Assistant Examiner* — Shawn M Braden
(74) *Attorney, Agent, or Firm* — Jackson IPG PLLC

(57) ABSTRACT

A drinking container includes a main reservoir for containing a quantity of beverage; a cooling reservoir releasably sealingly secured to the main reservoir and including a passage on an inner surface, the passage having one end open to bottom and the other end open to interior of the cooling reservoir, and a spill opening defined by the passage; and a releasable enclosure releasably sealingly secured to the cooling reservoir and including at least one lid; wherein the quantity of beverage in the main reservoir can transfer to the cooling reservoir through the passage by tipping the main reservoir; and wherein each of the at least one lid can be opened by pressing.

4 Claims, 10 Drawing Sheets

(56) References Cited

U.S. PATENT DOCUMENTS

| | | | |
|---|---|---|---|
| 6,629,431 B1* | 10/2003 | Robertson | 62/457.6 |
| 6,811,049 B2* | 11/2004 | Lukacevic | 220/254.3 |
| 7,100,790 B2* | 9/2006 | Dark | 220/711 |
| D537,675 S* | 3/2007 | Khalifa | D7/392.1 |
| 7,819,271 B2* | 10/2010 | Hollis et al. | 220/254.5 |
| 7,922,030 B2* | 4/2011 | Waller | 220/719 |
| 2002/0003145 A1* | 1/2002 | Milan | 220/713 |
| 2003/0178433 A1* | 9/2003 | Adams | 220/703 |
| 2005/0087539 A1* | 4/2005 | Waller | 220/713 |
| 2006/0124645 A1* | 6/2006 | Peitersen | 220/374 |
| 2006/0163251 A1* | 7/2006 | Kelstrom et al. | 220/253 |
| 2006/0226147 A1* | 10/2006 | Phillips | 220/254.2 |
| 2008/0035652 A1* | 2/2008 | Lusareta | 220/713 |
| 2009/0108003 A1* | 4/2009 | Tripsianes | 220/521 |
| 2009/0108006 A1* | 4/2009 | Milan | 220/592.17 |
| 2010/0308046 A1* | 12/2010 | Serra | 220/212 |

* cited by examiner

DRINKING CONTAINER WITH COOLING RESERVOIR

BACKGROUND OF THE INVENTION

1. Field of the Invention

The invention relates to disposable beverage containers and more particularly to a drinking container having an upper cooling reservoir so that an immediate drinking can be carried out by opening a hinged lid of a cooling reservoir enclosure after containing hot beverage (e.g., coffee or tea) in the container and tipping the container.

2. Description of Related Art

It is understood that the optimum temperature for drinking coffee from a coffee cup is about 85° C. Disposable coffee cups employed by fast food restaurants are made of plastic with thermal insulation for containing hot coffee. A lid is releasably provided on a top opening of the cup. A sip opening is formed on the lid so that a consumer may sip the coffee through the sip opening. It is typical that coffee contained in the cup served by fast food restaurant may have a temperature more than 85° C. A consumer may have to open the lid to cool the coffee for some time if he/she wants to drink the coffee quickly. However, the fastening of the lid and the cup is very tight. It is required that a consumer has to exert a great force to open the cup. This, unfortunately, may permanently deform the plastic cup and even spill the hot coffee to pollute clothes, the ambient articles, or components inside a vehicle and/or cause accidental injuries to the fingers. These are problems experienced by the conventional coffee cups.

For solving the spillage problem, a wide variety of non-spill drinking containers are disclosed. For example, U.S. Pat. No. 3,301,459 entitled "closure for drinking containers" aims to prevent hot beverage contained a cup from spilling while drinking without removing the closure. Moreover, U.S. Pat. Nos. 3,722,783, 4,113,135, 4,285,442, 4,394,928, 4,412,629, 4,582,214, 4,615,459, 5,090,584, 5,183,172, 5,253,781, 5,490,609, 6,196,404, and 6,612,456 all addressed non-spilling container lid.

Consumers injured by spilled hot coffee are not uncommon. For example, Stella Liebeck v. McDonald's Corporation, also known as the "McDonald's coffee case", is a well-known court case in the United States.

A consumer has to open a top to add condiments (e.g., creamers and sweeteners) to hot beverage (e.g., coffee or tea) contained in a typical container having a snugly fit lid. However, it is often during this activity that injurious splashes or spills of the hot beverage occur, especially, in a moving vehicle. For solving above problem, U.S. Pat. No. 5,894,952 entitled "Spill resistant cup lid with condiment funnel and stirring rod" discloses a funnel on center of a releasable lid, the funnel having an opening for adding condiments and allowing a stirring rod to insert through for stirring purpose; and a spout having a sip opening. However, a consumer has to wait a period of time until beverage contained in the cup is cooled to a temperature below 85° C. if the hot beverage has a temperature greater than 85° C. initially. The "952 Patent" still does not solve the problem of waiting for cooling beverage.

There are two drawbacks associated with opening a lid for cooling hot beverage contained in a beverage container. One is that it is impossible of completely avoiding splashing or overturning of the hot beverage and the other is the great reduction of time of sipping the beverage (e.g., coffee) because the beverage has been greatly cooled in a relatively short period of time. For solving above problem, U.S. Pat. No. 6,176,390 entitled "container lid with cooling reservoir" discloses a cooling reservoir is provided in a lid. The cooling reservoir has a side wall with a small opening to allow a small volume of a hot beverage contained in the container to pass into the cooling reservoir by tipping the container. In the cooling reservoir the beverage sufficiently cools down to enable a consumer to sip the beverage.

However, the "390'Patent" suffers from a drawback. In detail, a consumer has to tilt the container to sip the beverage while the hot beverage in the container flows into the cooling reservoir to mix with the cooled beverage. However, the consumer may not be aware of the mixing. Hence, the consumer may drink the beverage without knowing that the beverage is hotter than he/she thinks. It is often that the consumer may be injured by the hot beverage. The "390'Patent" is particularly undesirable to a vehicle driver since he/she may concentrate on driving while drinking the beverage.

Moreover, U.S. Pat. No. 6,571,973 entitled "cup lid with cooling spillover chamber" discloses a lid for a cup having a rim having a first component having a sip opening, the sip opening being located on the first component so as to be adjacent the rim of the cup when the lid is mounted on the cup. The lid further includes a second component having an edge defining at least a portion of a spill opening, the spill opening being spaced from the sip opening substantially along a line corresponding to a diameter of the rim of the cup when the lid is mounted on the cup. The lid still further includes a spillover chamber connected to the second component so as to receive liquid from within the cup through the spill opening when the cup is tipped toward the second position, the spillover chamber being outside of the cup when the lid is mounted on the cup. Finally, the lid includes a transfer structure providing a path to transfer liquid from the spillover chamber to the sip opening when the cup is tipped toward the sip opening, and a barrier to prevent transfer of liquid from within the cup to the sip opening without passing through the spillover chamber in any tipping position of the cup.

The "973'Patent" enables a small portion of the hot liquid inside to be cooled rapidly for immediate drinking while the remainder of the liquid is kept hot. However, the "973 Patent" still suffers from a drawback. In short, after sufficiently cooling down the beverage contained in the cup, the consumer has to remove the lid completely for drinking. This inevitably may increase the possibility of spillage.

Thus, the need for solving the above discussed problems of the prior art still exists. Moreover, notwithstanding the prior art, the invention is neither taught nor rendered obvious thereby.

SUMMARY OF THE INVENTION

It is therefore one object of the invention to provide a drinking container having a cooling reservoir. A consumer may tip the container to transfer beverage from the container to the cooling reservoir. After a short period of time, the beverage inside the cooling reservoir can be sufficiently cooled down so that the consumer may start drinking right away. This is done without removing the lid so as to completely eliminate the problem of spillage, which otherwise may cause splashing or overturning and even accidental injuries.

It is another object of the invention to provide a drinking container having a cooling reservoir so as to enable a small portion of the hot beverage inside the cooling reservoir to be cooled rapidly for immediate drinking while the remainder of the liquid inside the container is kept hot.

In one aspect of the invention a consumer can be aware of the readiness of beverage contained in the cooling reservoir by hand feeling after a number of times of using the drinking container. Therefore, the possibility of consuming a goodly quantity of the beverage in its overheated condition is greatly decreased.

In another aspect of the invention a consumer does not have to remove the cooling reservoir to cool the beverage inside the container. Further, heat of the beverage inside the container can be retained for a prolonged period of time so that a consumer can enjoy sipping.

The above and other objects, features and advantages of the invention will become apparent from the following detailed description taken with the accompanying drawings.

DETAILED DESCRIPTION OF THE INVENTION

Figure 1:
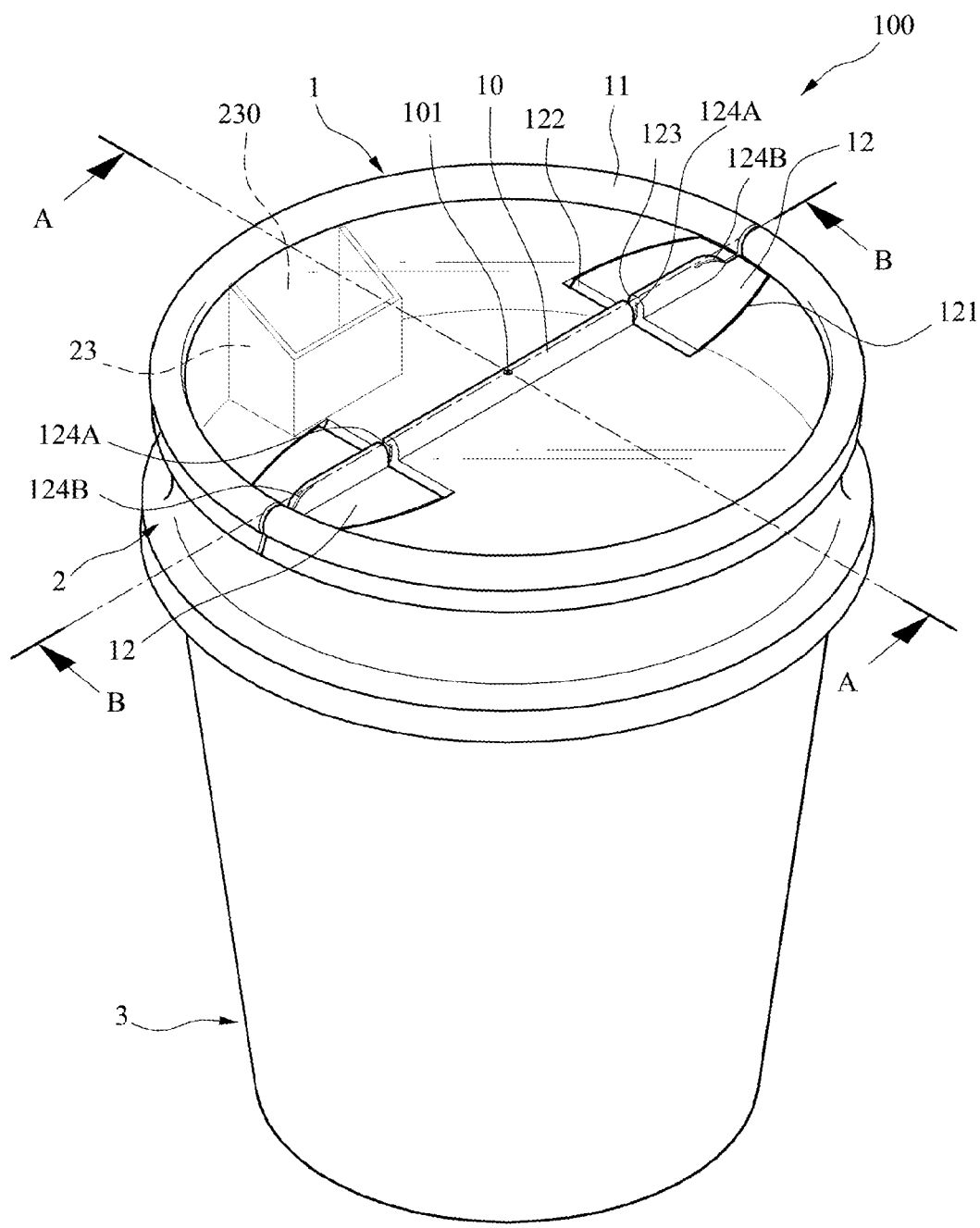
FIG. 1 is a perspective view of a drinking container according to the invention.
Figure 2:
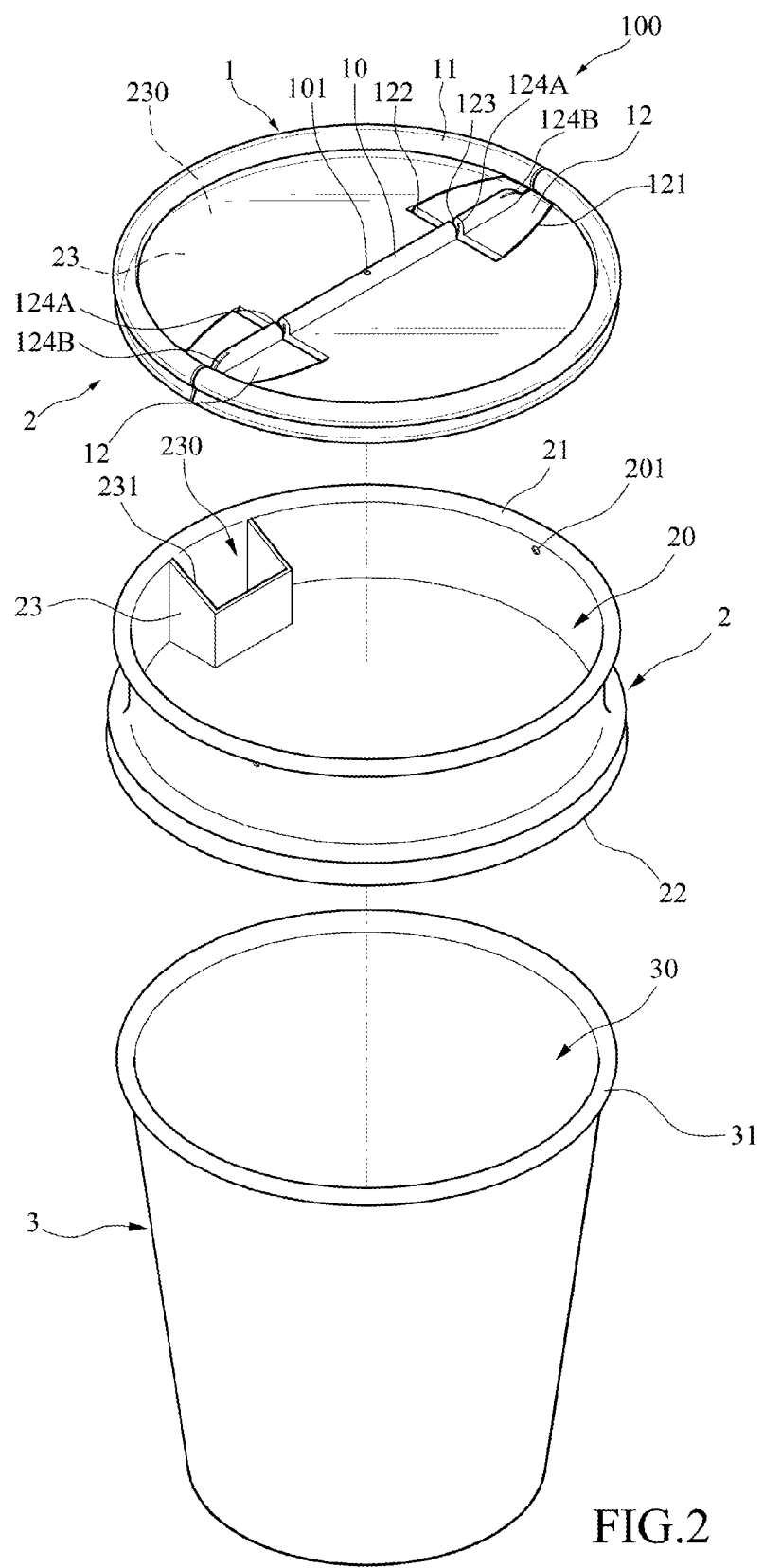
FIG. 2 is a perspective exploded view of the drinking container of FIG. 1.
Figure 3:
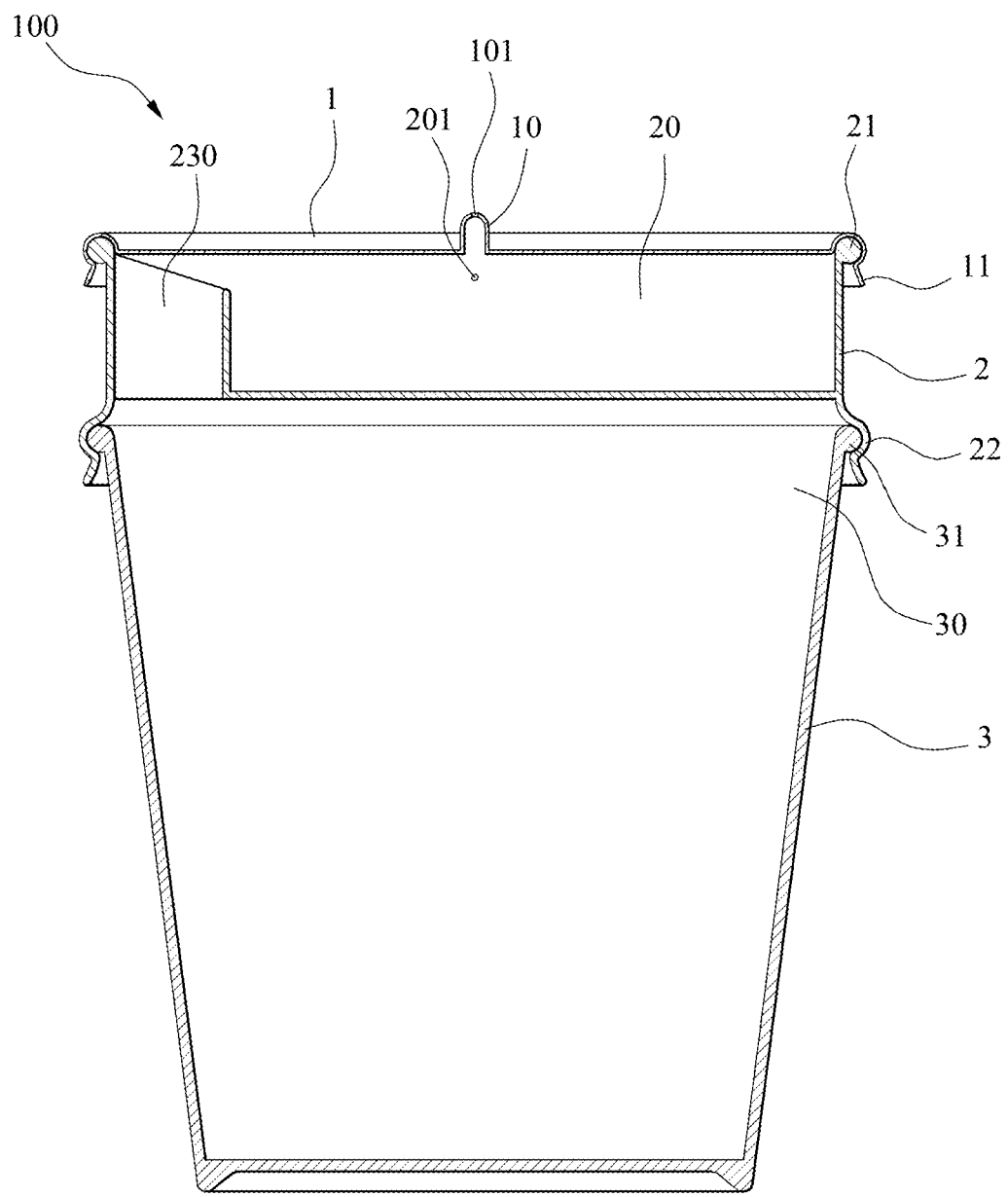
FIG. 3 is a longitudinal sectional view of the drinking container taken along line A-A of FIG. 1.
Figure 4:
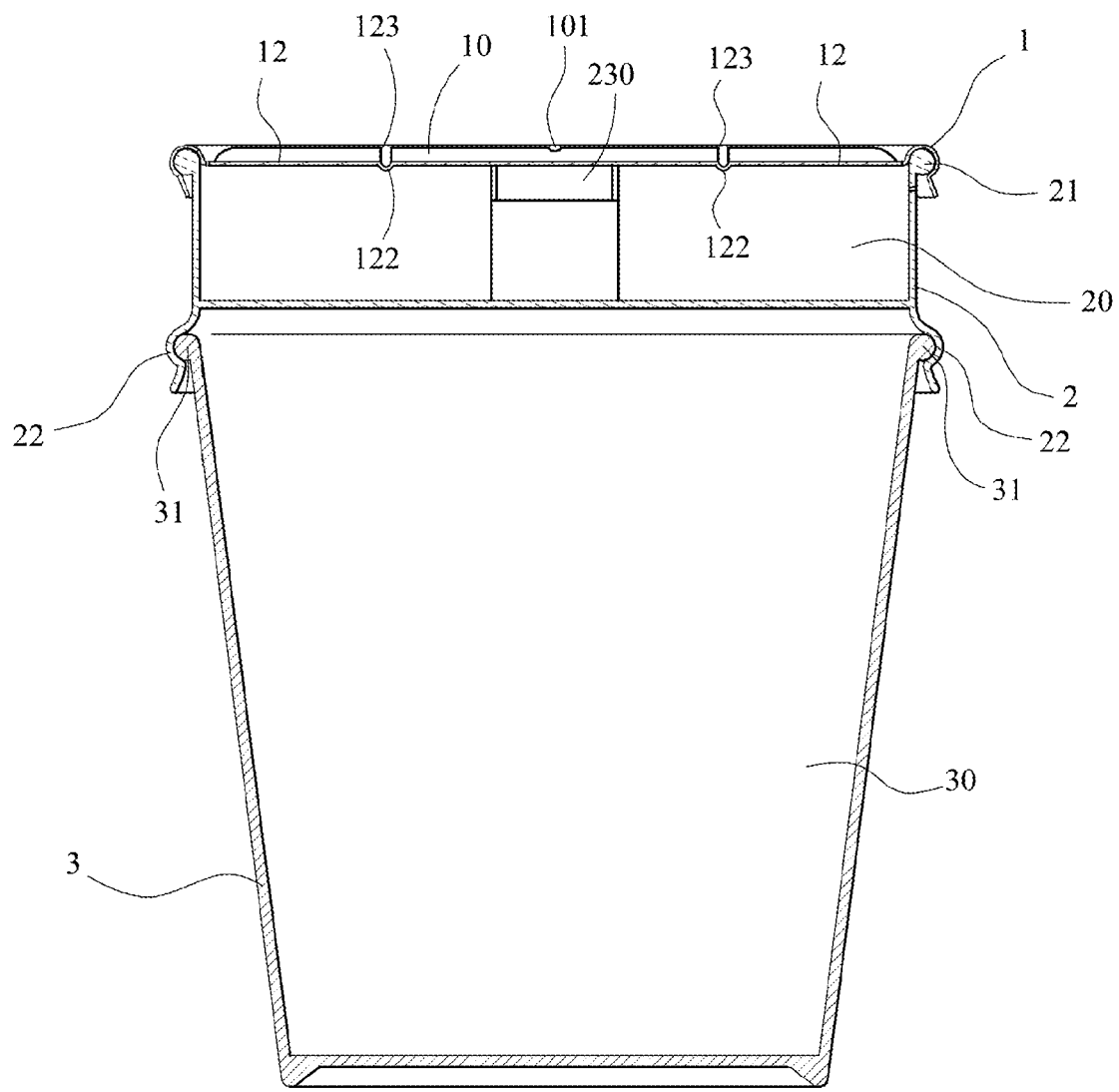
FIG. 4 is a longitudinal sectional view of the drinking container taken along line B-B of FIG. 1.
Figure 5:
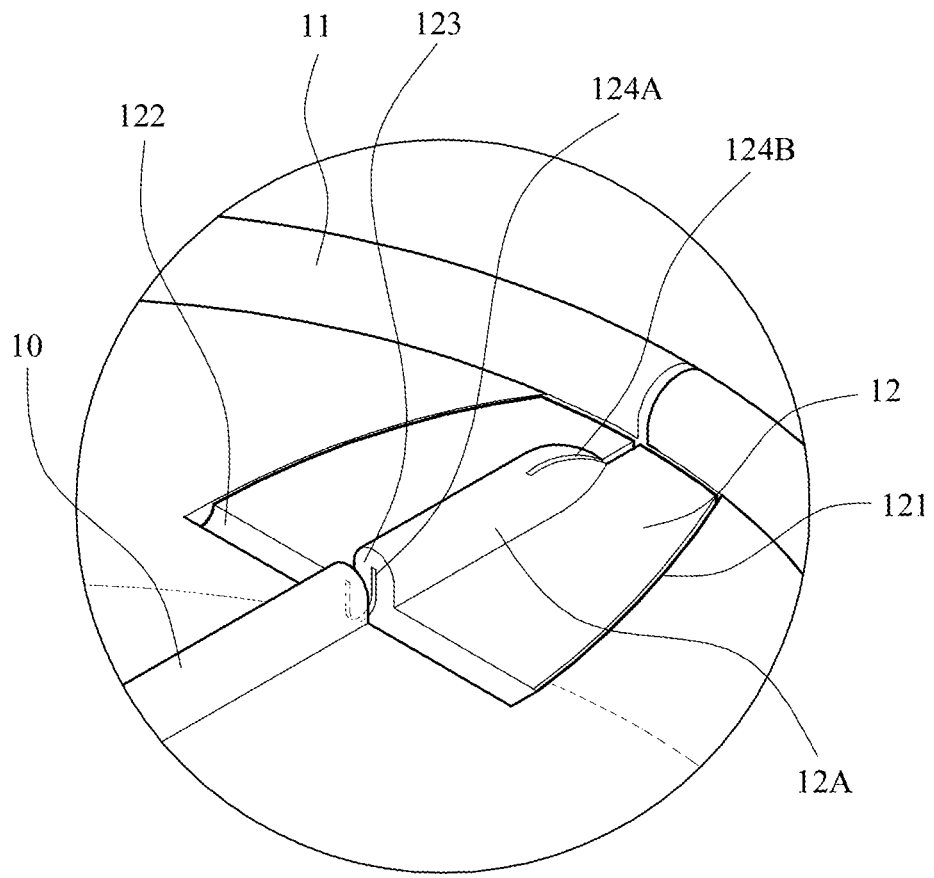
FIG. 5 is a detailed view of one end of the diametrically oriented ridge of FIG. 1.
Figure 6:
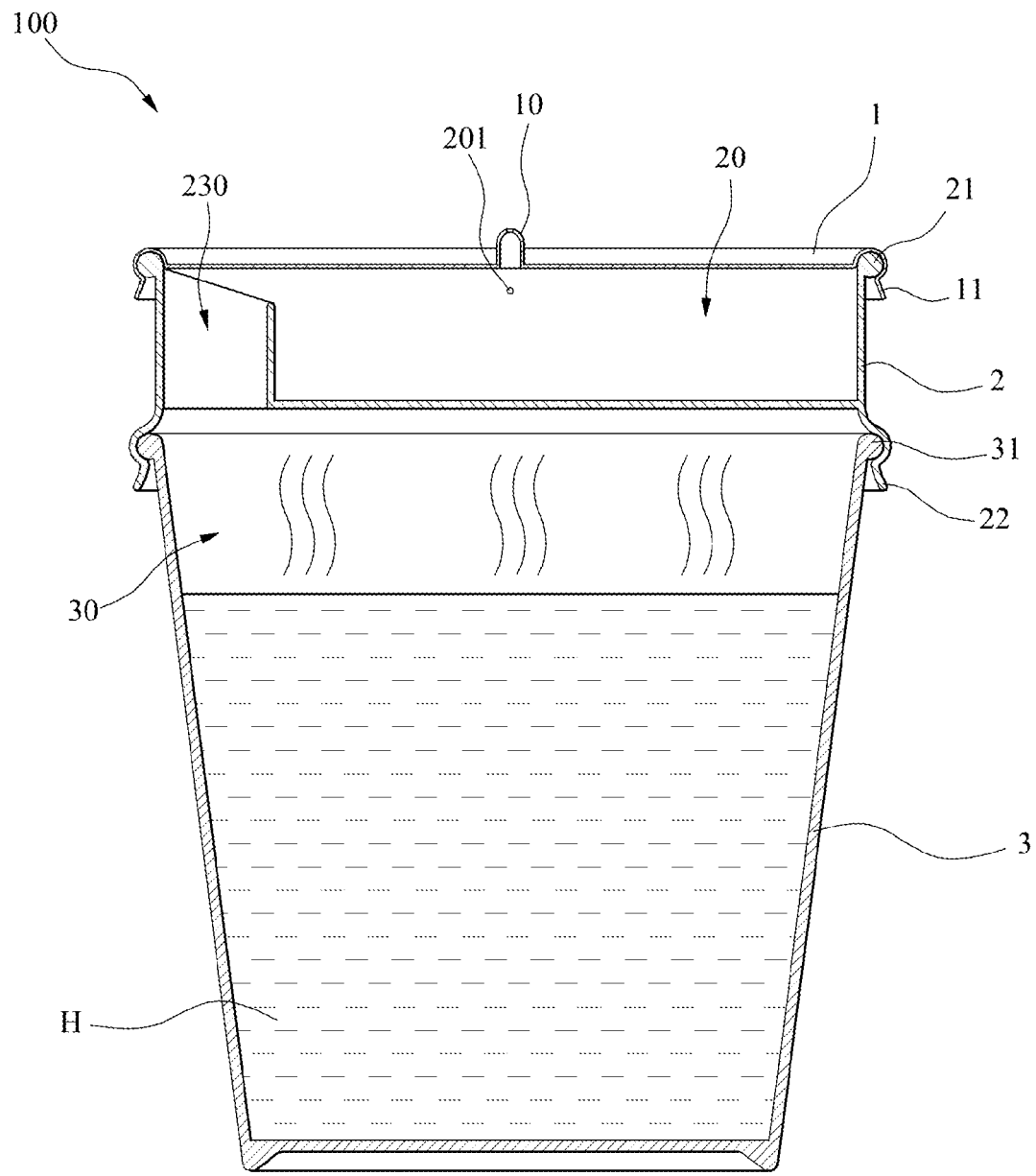
FIG. 6 is a view similar to FIG. 3 showing hot beverage inside the drinking container.
Figure 7:
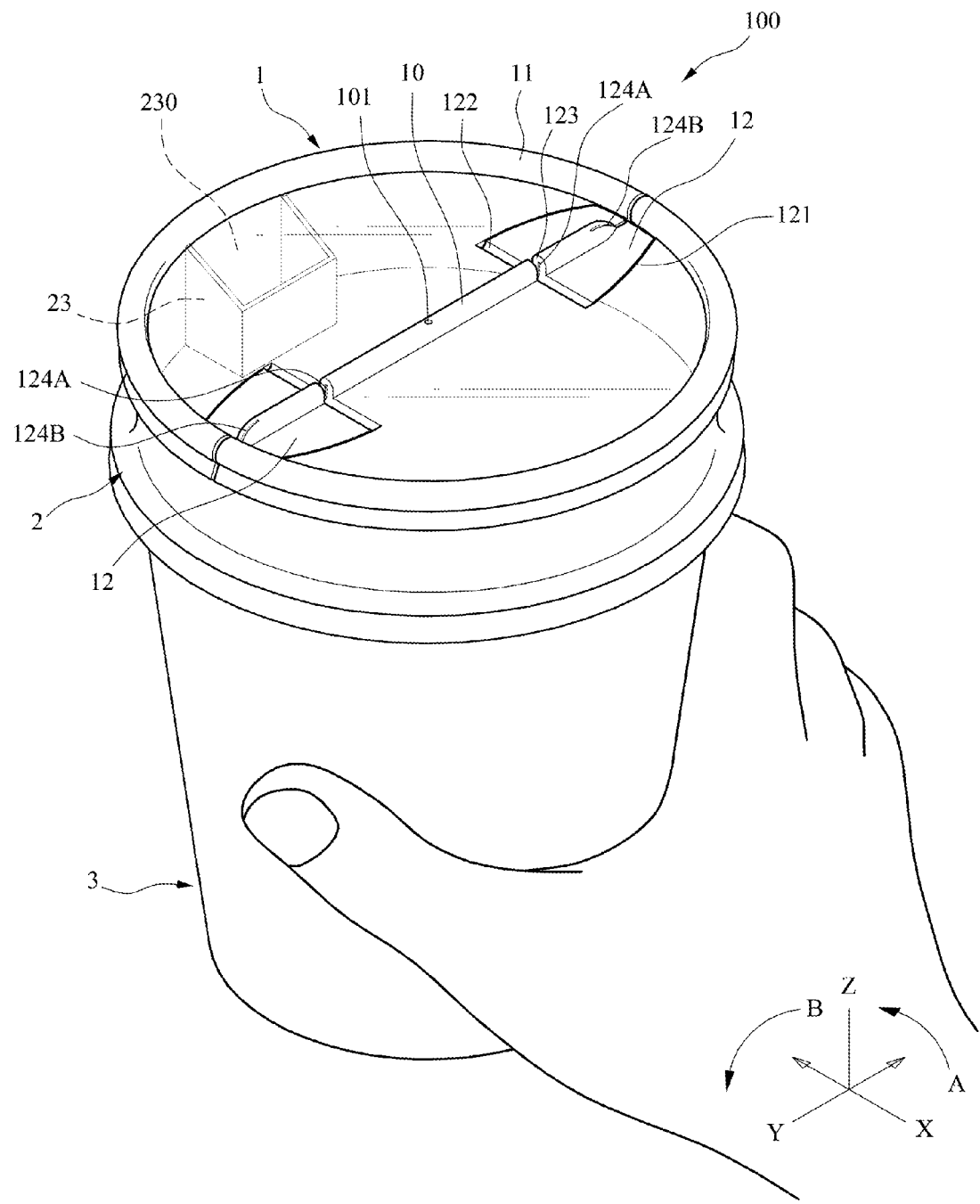
FIG. 7 is a view similar to FIG. 1 showing the hand holding the drinking container with hot beverage contained therein.
Figure 8:
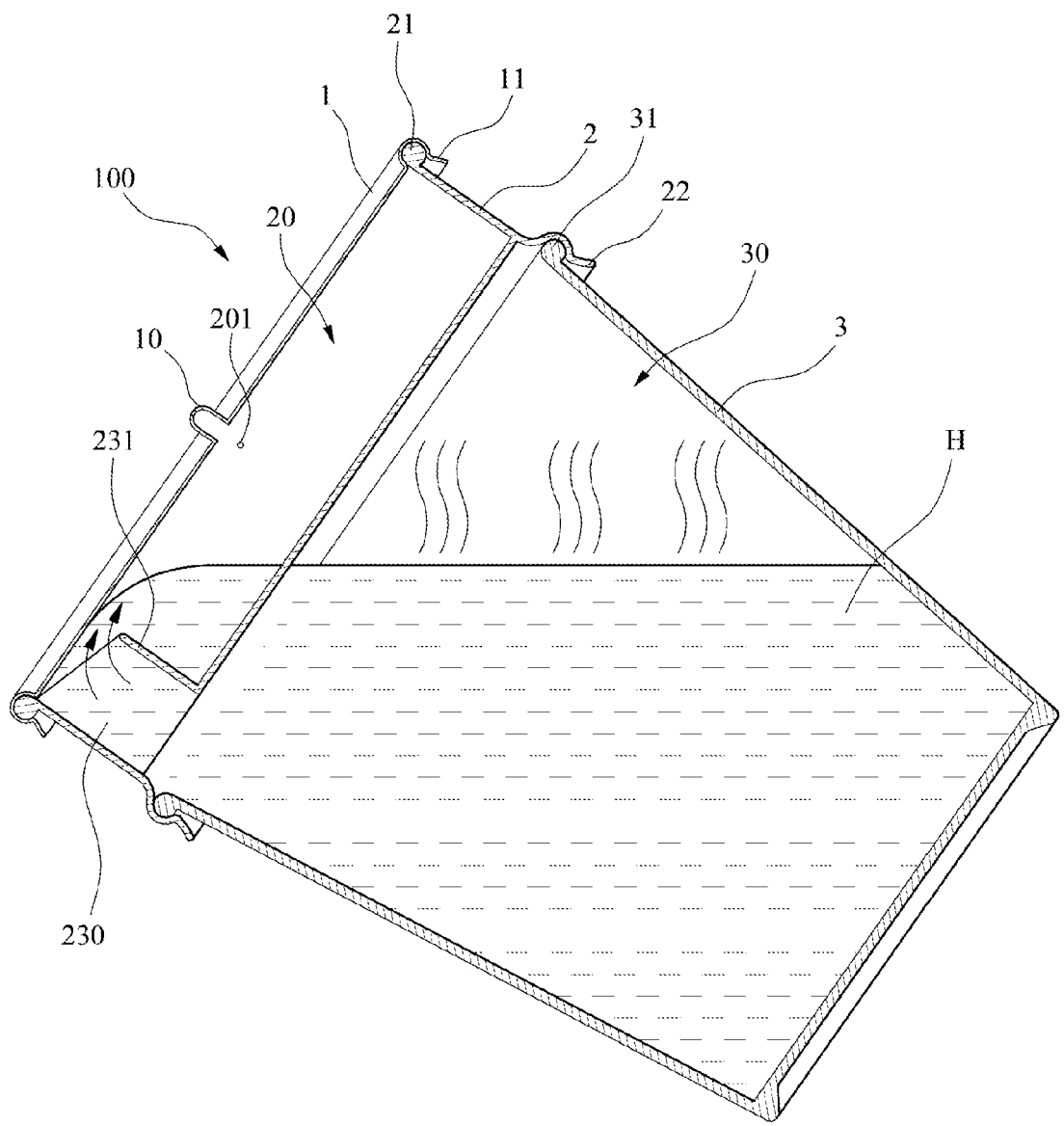
FIG. 8 is a view similar to FIG. 6 showing the hot beverage being transferred to the cooling reservoir through the spill opening when the container is tipped about 45-degree.
Figure 9:
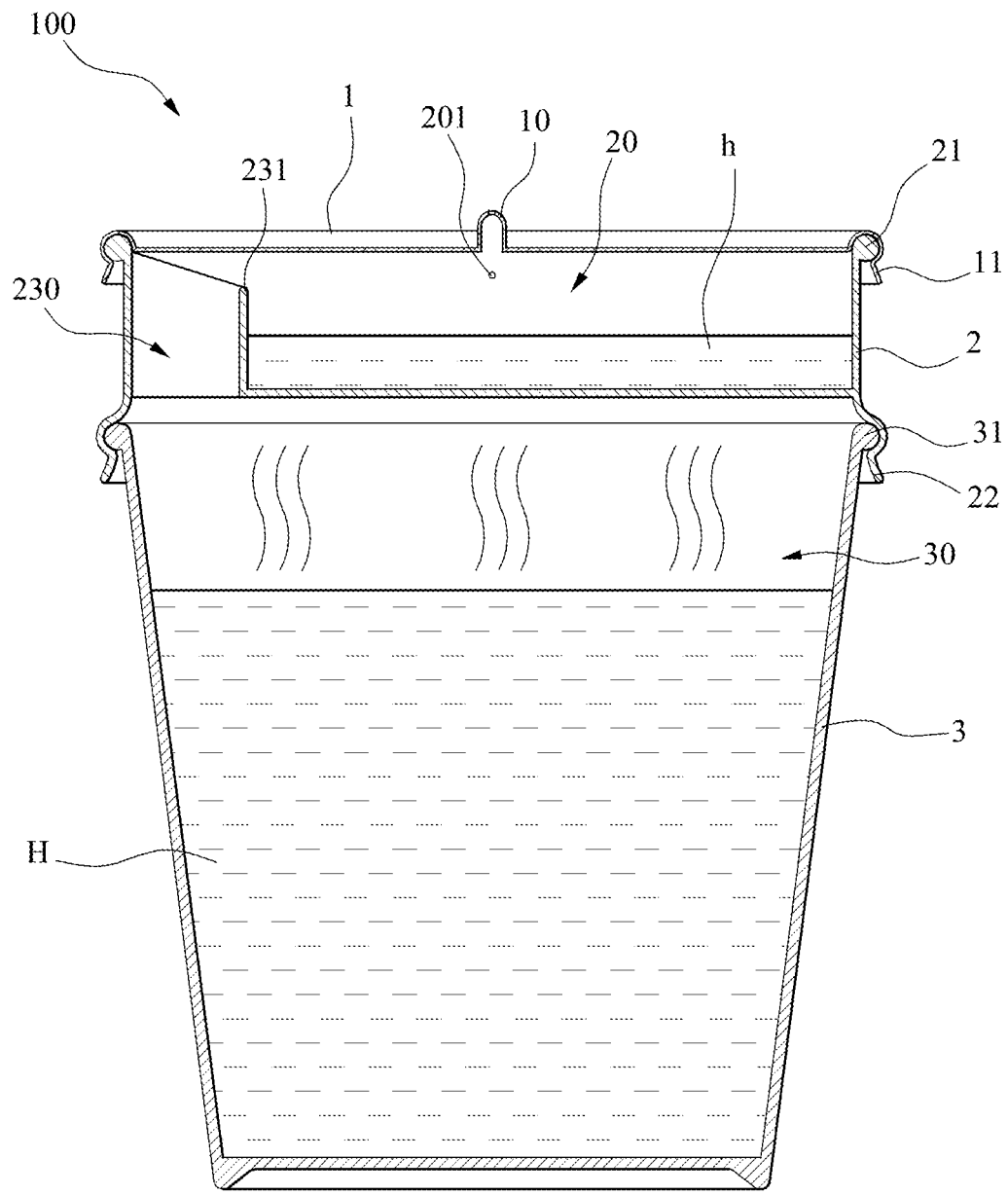
FIG. 9 is a view similar to FIG. 6 showing a small portion of the hot beverage stored inside the cooling reservoir to be cooled rapidly for immediate drinking while the remainder of the liquid inside the container is kept hot.

Referring to FIGS. 1 to 10, a drinking container 100 in accordance with the invention comprises the following components as discussed in detail below.

A releasable enclosure 1 is shaped as a disc and comprises a circumferential channel 11 having a concave outer surface; a diametrically oriented ridge 10 on top, the ridge 10 including a central first air vent 101; two opposite lids 12 at both ends of the ridge 10 respectively, each lid 12 being substantially shaped as a truncated trapezoid and bordered by both a substantially U-shaped sip opening 121 and a straight grooved hinge 122 on the top of the enclosure 1, the lid 12 and either end of the ridge 10 being separated by a cut recess 123 on a center of the hinge 122, a first slit 124A being formed in each recess 123, and two opposite second slits 124B each being formed across a portion of a top central raised member 12A of the lid 12 and the channel 11.

A cooling reservoir 2 is shaped as a shallow, hollow cylinder and comprises an internal space 20, two opposite second air vents 201 on a circumferential side wall, a circumferential top rim 21, a circumferential bottom rim 22, and a passage 23 abutted on the side wall of the cooling reservoir 2 and having one end open to bottom of the cooling reservoir 2 and the other end open to top, the passage 23 including a side wall 231 of U-cross section, the side wall 231 having an inclined top edge (i.e., inclining toward bottom center of the cooling reservoir 2), and a spill opening 230 defined by the side wall 231. An inverted conic main reservoir 3 comprises an internal space 30 and a circumferential top rim 31. As viewed from FIGS. 1 and 7, in order to facilitate the consumer with seeing and drinking the berverage h inside the cooling reservoir 2, the passage 23 can be seen clearly, the enclosure 1 therefore is made from a transparent material.

The main reservoir 3 is formed of expandable polystyrene or paper which is capable of retaining heat, relatively rigid, and friendly to the lips. Each of the enclosure 1 and the cooling reservoir 2 is formed by injection molding. Alternatively, both the enclosure 1 and the cooling reservoir 2 are formed of the same material as the main reservoir 3.

Figure 10:
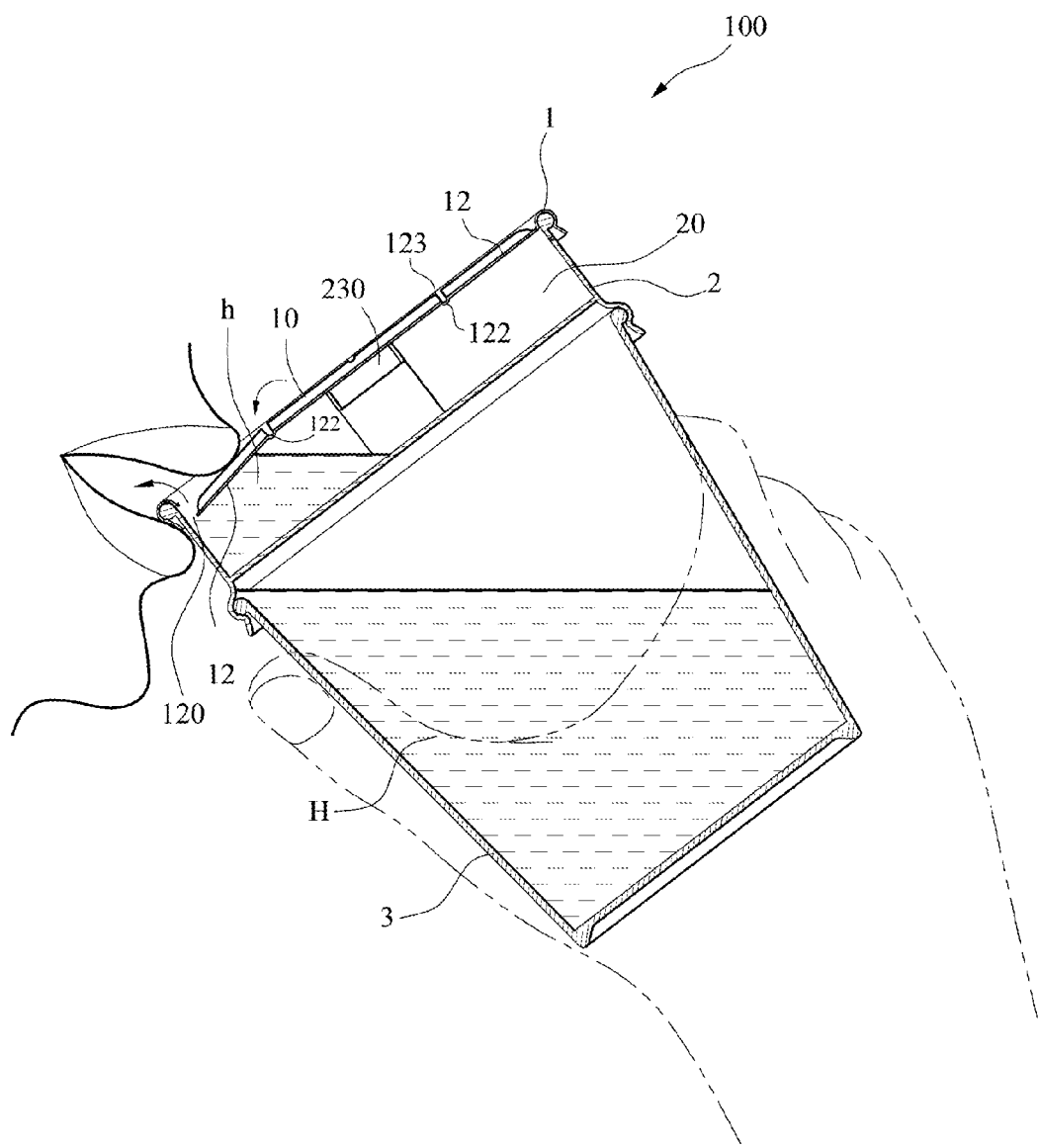
FIG. 10 is a view similar to FIG. 4 showing the cooled beverage inside the cooling reservoir being sipped by a consumer by depressing the lid by the lip after tipping the container.

After filling a desired volume of hot beverage (e.g., coffee or tea) H in the main reservoir 3, an employee of, for example, a fast food restaurant may snap the circumferential bottom rim 22 over the circumferential top rim 31 to temporarily sealingly fasten the cooling reservoir 2 and the main reservoir 3 together and next snap the circumferential channel 11 over the circumferential top rim 21 to further temporarily sealing fasten the cooling reservoir 2 and the enclosure 1 together. After taking the drinking container 100 from the employee, a consumer may hold and tip the main reservoir 3 to allow a small volume of hot beverage H to transfer to the cooling reservoir 2 via the spill opening 230 (see FIGS. 7 and 8). Note that the inclined top edge of the side wall 231 renders the fluid transfer possible. Next, the consumer may return the drinking container 100 in an upright position (see FIG. 9). It is envisaged by the invention that the beverage h inside the cooling reservoir 2 can be sufficiently cooled down in a short period of time. Next, as shown in FIG. 10, the consumer may tip the drinking container 100 and use his or her upper lip to press to open the normally closed hinged lid 12 to open the cooling reservoir 2. Next, the consumer may sip the cooled beverage inside the cooling reservoir 2 for immediate drinking through the opening 120, after drinking, normally closed hinged lid 12 will soon be closed automatically as its originally to prevent causing splashing or overturning and even accidental injuries when mobile or driving a vehicle.

It is envisaged by the invention that to strengthen the supporting force for the hinge 122 on the top of the enclosure 1 to enable the each lid 12 to keep its normally closed or engaged with the channel 11, the invention provides the ridge 10 and the top central raised member 12A of the lid 12, and the provision of the first and second slits 124A, 124B facilitates the opening of the lids 12 by the consumer's lips as shown in FIG. 10. The lid 2 and the corresponding sip opening 121 are normally sealingly engaged each other when the lid 2 is not opened so as to prevent beverage h inside the cooling reservoir 2 from flowing out of through the lids 2. The drinking process thus can be done without removing the enclosure 1 and/or the cooling reservoir 2 so as to avoid the problem of splashing and/or overturning. Moreover, the beverage H inside the main reservoir 3 is hotter than the beverage h inside the cooling reservoir 2 due to the thermal insulation of the main reservoir 3 in the drinking process and the first and second air vents 101, 201 for heat dissipation. Thus, a prolonged period of time for drinking beverage in a desirable temperature can be achieved. Finally, a consumer can be aware of the readiness of beverage contained in the cooling reservoir by hand feeling after a number of times of using the drinking container. Therefore, the possibility of consuming a goodly quantity of the beverage in its overheated condition is greatly decreased.

While the invention has been described in terms of preferred embodiments, those skilled in the art will recognize that the invention can be practiced with modifications within the spirit and scope of the appended claims.

What is claimed is:

1. A drinking container comprising:
a main reservoir (3) for containing a quantity of beverage;
a single cooling reservoir (2) releasably sealingly secured to the main reservoir (3) and comprising a passage (23) on an inner surface, the passage (23) abutted on a side wall of the cooling reservoir (2) and the passage (23) extending longitudinally along the side wall of the cooling reservoir having one end open to a bottom of the cooling reservoir (2) and another end open to an interior of the cooling reservoir (2), and a spill opening (230) defined by the passage (23);
wherein the passage (23) has a side wall (231) with two sides, each side having an upper edge sloped downward from the side wall of the cooling reservoir towards both the bottom of the cooling reservoir (2) and a center of the cooling reservoir (2) as each of the sides of the side wall (231) extends away from the side wall of the cooling reservoir; and
a transparent releasable enclosure (1) releasably sealingly secured to a top of the cooling reservoir (2) and comprising at least one lid (12);
wherein the quantity of beverage in the main reservoir (3) can transfer to the cooling reservoir (2) through the passage (23) by tipping the main reservoir (3); and
wherein each lid (12) can be opened by pressing inward.

2. The drinking container of claim 1,
wherein the enclosure (1) further comprises a diametrically oriented top ridge (10), and wherein the at least one lid (12) comprises two opposite lids (12) at both ends of the top ridge (10) respectively, each lid (12) having a hinge end (122) integrally formed with the enclosure (1), each hinge end (122) configured to open each respective lid (12) by pressing inward.

3. The drinking container of claim 1,
wherein the cooling reservoir (2) further comprises a circumferential top rim (21) and a circumferential bottom rim (22), and wherein the enclosure (1) further comprises a circumferential channel (11) for snapping over the top rim (21).

4. The drinking container of claim 3,
wherein the main reservoir (3) comprises the circumferential bottom rim (22) for snapping over a top rim (31) of the main reservoir (3).

* * * * *